Figures 1, 2:
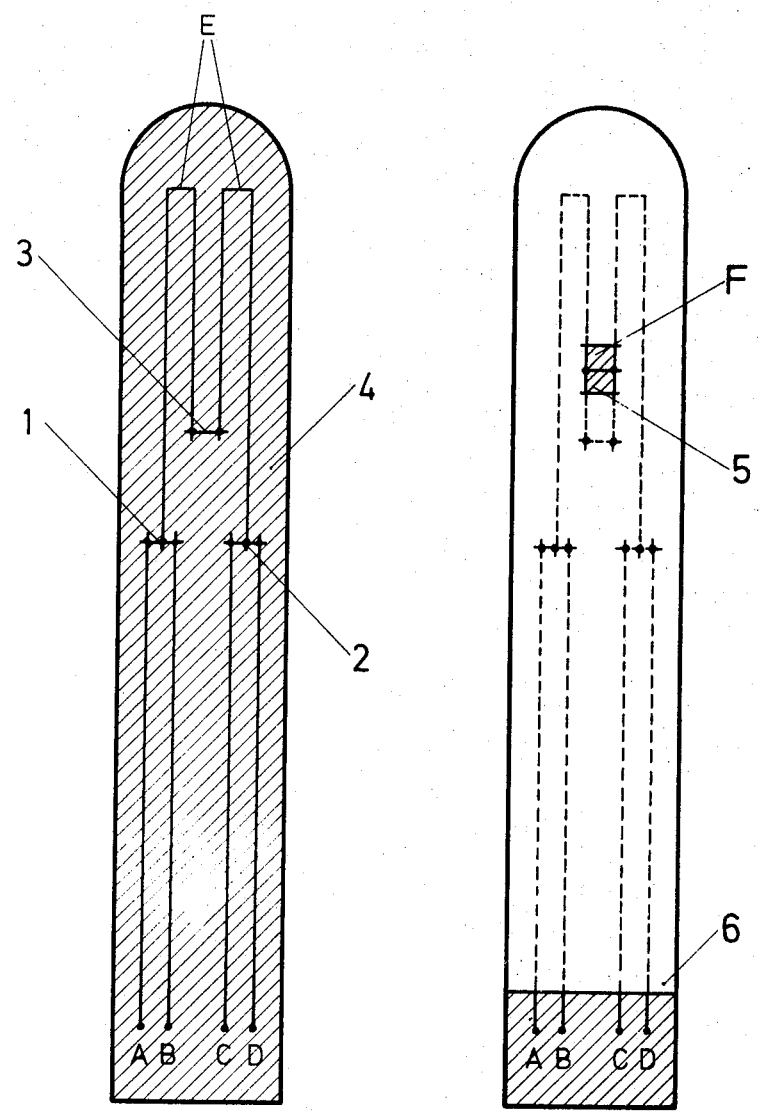

United States Patent [19]
Horsch

[11] 3,830,105
[45] Aug. 20, 1974

[54] TEMPERATURE MEASURING DEVICE FOR ENAMELLED APPARATUS

[75] Inventor: Rudi Horsch, Schwetzingen, Germany

[73] Assignee: Pfaudler-Werke AG, Schwetzingen, Germany

[22] Filed: May 4, 1972

[21] Appl. No.: 250,161

[30] Foreign Application Priority Data
May 11, 1971   Germany............................ 2123371

[52] U.S. Cl............................. 73/362 AR, 338/28
[51] Int. Cl........ G01k 7/16, G01k 1/14, H01c 3/00
[58] Field of Search........ 73/362 AR, 343 B, 343 R; 338/28

[56] References Cited
UNITED STATES PATENTS

| | | |
|---|---|---|
| 769,364 | 9/1904 | Tory et al...................... 73/362 AR |
| 834,162 | 10/1906 | Northrup.......................... 338/28 X |
| 2,120,335 | 6/1938 | Lederer...................... 73/362 AR X |
| 3,436,713 | 4/1969 | Di Noia .............................. 338/28 |
| 3,497,854 | 2/1970 | Yonkers.............................. 338/28 |
| 3,543,583 | 12/1970 | Holsten ...................... 73/362 AR X |
| 3,610,045 | 10/1971 | Shearman.......................... 73/343 B |

Primary Examiner—Richard C. Queisser
Assistant Examiner—Frederick Shoon
Attorney, Agent, or Firm—Flynn & Frishauf

[57]           ABSTRACT

A temperature sensing probe having resistance wires embedded in enamel layers, connected by parallel located wires of a loop, which are interconnected to provide a predetermined resistance value.

4 Claims, 2 Drawing Figures

TEMPERATURE MEASURING DEVICE FOR ENAMELLED APPARATUS

The present invention relates to a temperature measuring device for enamelled apparatus, and more particularly to be incorporated or embedded in the enamel of enamel tubes, vessels and the like, of so-called glass-lined equipment for use in processing industry; and to a method of making the device.

Temperature measuring devices for enamelled apparatus have previously been proposed (U.S. Pat. No. 3,563,808) in which a thermal element is partially embedded into an enamel layer, by being molten therein. Thermal elements which are embedded by being molten into enamel layers have the advantage that they have a rapid response time and cannot cause leakage such as may result from external temperature sensing devices that are screwed or otherwise secured therein unless effectively sealed by a gasket. Such other temperature devices may utilize thermosensitive elements of tantalum, or enamelled tubes to receive mercury thermometers, resistance thermometers, or thermo elements or the like. The rapid response time with respect to ordinary thermometers is an advantage. Differential and repeated expansion or changes in pressure within the tube or vessel may lead to leaks if external temperature sensors are incorporated, all of which is avoided by melting in temperature sensitive elements into the enamel of a tube or vessel.

Thermo elements which are incorporated within the enamel layer of enamelled devices have been subject to the difficulty that existing measuring apparatus and control devices, as usually available in chemical plants and installations, are usually not readily compatible with temperature measuring by thermo elements. Thermo elements have very small output signals and thus require high amplification before use. Any errors which may arise due to use of alloys, or imperfect contacts, as well as electromagnetically coupled induction fields are then amplified as well. Further, the non-linearity of the thermo elements which are used in enamels is particularly disadvantageous if the output signal is to be used directly for control purposes.

It is an object of the present invention to provide a temperature measuring apparatus, and a method to make the same, which has the high response speed of electrical devices, and yet can measure the temperature with accuracy.

SUBJECT MATTER OF THE PRESENT INVENTION

Briefly, a resistance thermometer is provided which has a measuring loop, formed of resistance wires embedded in the enamel, the measuring loop having a predetermined resistance which is accurate within the tolerance of commercial measuring and control apparatus. Such resistance wires of resistance thermometers, known by themselves, can be provided with a predetermined resistance only if the measuring loop itself has a predetermined resistance. This predetermined accurate resistance must be determined since the resistance value of non-embedded, raw resistance wire differs from that when the wire is embedded into the enamel, by being incorporated in the melt thereof. This, apparently, is due to compressive stresses which arise during enamelling, which may extend to about 15 kp/mm². This is sufficient to change the resistance value even of a previously adjusted measuring line by a sufficient value, typically several percent of resistance, so that resistance thermometers in which resistance wires are embedded in enamel previously could not be used. Wire of flattened cross-section is used.

The accurate resistance value of the resistance wire can be adjusted by so making the resistance element that the resistance wire loop is not enamelled over its entire extent, but rather, in accordance with a preferred embodiment, a wire of slightly greater resistance, forming a loop, of parallel conductors is placed in or on the device in which the resistance element is to be incorporated, and then a small window is left near the terminal end to permit placement of a cross connection at an exact resistance value. This region is subsequently covered by an enamel layer.

The invention will be described by way of example with reference to the accompanying drawings, wherein:

FIG. 1 illustrates, in longitudinal section, a developed tube covered with a first enamel layer on which resistance wires in accordance with the invention are applied; and FIG. 2 illustrates a step in the manufacture of the resistance element, and showing the window.

A tube 4, which may, however, be any kind of vessel or body or surface capable of being enamelled, has a first covering enamel layer applied thereto. Resistance wires are located on the first base enamel layer, as shown in FIG. 1. Other arrangements of wires may be used. The example shown in FIG. 1 illustrates a four-line network, well known to be used to apply a constant current to a resistance thermometer, in order to make the measuring determination of the voltage drop independent of resistance of the connecting lines. Terminals A, B, C, and D of the connecting lines are provided to permit eventual connection to a terminal board or the like, for further connection to a measuring or control device. The supply lines or conductors are, for example, platinum wires which are interconnected at their ends by a cross connection, forming junctions 1, 2. The cross connections, in turn, connect to the end terminals of a measuring loop E. The short end of the measuring loop E is interconnected by a wire bridge 3. Preferably, the lengths of the wires between points 2 and 3 are so chosen that, at ordinary ambient room temperature, a resistance of for example 115 Ohms is obtained. Such a resistance would be selected if the eventual final measuring resistance is to have 100 Ohms at 0°C. The measuring loop is preferably formed of a flat, tape-like platinum wire which may have an overall cross section area of about 0.003 mm², and a length of about 3 m. In the illustration as shown, the measuring loop is formed with elongated parallel paths in order to sense the average value of temperature within a substantial volume of the tube. If, however, the temperature of only a small zone is to be measured, then the loop can be spirally located around the tube. Other circuits than those shown may be used, such as three conductors, two conductor lines or the like.

After placement of the temperature sensitive wires, that is, of the 115 Ohm-nominal platinum wires E, the supply conductors as well as the temperature sensitive conductors are covered by enamel, for example two or three further covering enamel layers. Before applying these further layers, however, a small window F is masked, so as to be left free from enamel (FIG. 2); this window may, for example, have a dimension of 2 × 6 cm. Window F is located in that region of the measuring loop which is adjacent the terminal end. Upon bridging the wires of the measuring loop at a point closer to their connecting ends, a smaller resistance is obtained, and this is done after the enamel layers — leaving the window F free — have been fired. The specific location of the cross wire 5 for the cross bridge under the window F is preferably determined by supplying the resistance wires from a constant current source, and utilizing a compensated amplifier, while accurately determining the wire temperature, in accordance with the four-conductor principle. After placement of the cross bridge 5, to obtain a nominal resistance of 100 $\Omega$, and connecting the wire 5 securely to the two parallel loop conductors, enamel is applied over the window F and fired, in order to protect the entire wires of the measuring loops, both against corrosion, and to provide electrical insulation therefor. The enamelling and firing of the window does change the measuring resistance, however only to such a minor extent that it can be neglected. The changes introduced by this final firing are within the usual tolerances of customary resistance thermometers and associated equipment.

The present invention thus provides an embedded temperature sensing element in which the standard resistance value is accurately predetermined, even though resistance wires are melted into a fired enamel layer, to provide an accurately adjusted resistance element for incorporation in, or connection to, customary sensing devices.

Various changes and modifications may be made within the inventive concept.

I claim:

1. A temperature measuring device for large scale container apparatus protected by a vitreous enamel coating subject to high thermo-mechanical stresses, comprising:
   a support surface constituted by the surface of a probe extending through a major part of said container apparatus and supported on the wall of said apparatus only at one end of said probe, said probe having an enamel covering;
   two pair of conductor connection means for connections to measuring equipment external to said apparatus, said connection means being located adjacent to the end of said support surface supported on said wall of said apparatus;
   a measuring resistance conductor loop embedded in said enamel covering comprising two conductors that for almost all of their length are straight and parallel to each other and which are bridged across by a third conductor at a location such as to provide an electrical resistance of said loop, as embedded in said enamel covering, of a precise predetermined value convenient for thermometric evaluation, and
   two parallel pairs of lead conductors likewise embedded in said enamel covering, each pair connecting one end of said measuring loop to a pair of said connecting means,
   both said resistance measuring conductor loop and said lead conductors being of flattened cross-section oriented parallel to said support surface.

2. A temperature measuring device as defined in claim 1, in which the conductors of said measuring loop are folded back on themselves with the midportion of said measuring loop being between the portions of said conductors of said measuring loop respectively connected to said pairs of lead conductors and in which said support surface is cylindrical and elongated and in which, further, said conductors of said measuring loop are for almost all of their length parallel to the axis of said support surface.

3. A measuring device as defined in claim 1, in which said measuring loop is composed of flat platinum wire or tape of a cross-sectional area of about 0.003 mm$^2$.

4. A temperature meas ring device as defined in claim 1, in which said resistance loop as embedded in said enamel covering has a resistance of precisely a rounded off number of ohms at a predetermined reference temperature.

* * * * *